(No Model.)
A. HAID.
BATTERY.
No. 294,463.  Patented Mar. 4, 1884.
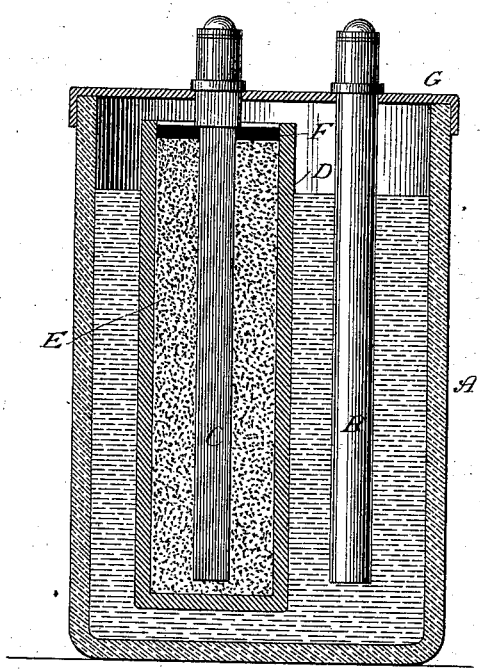
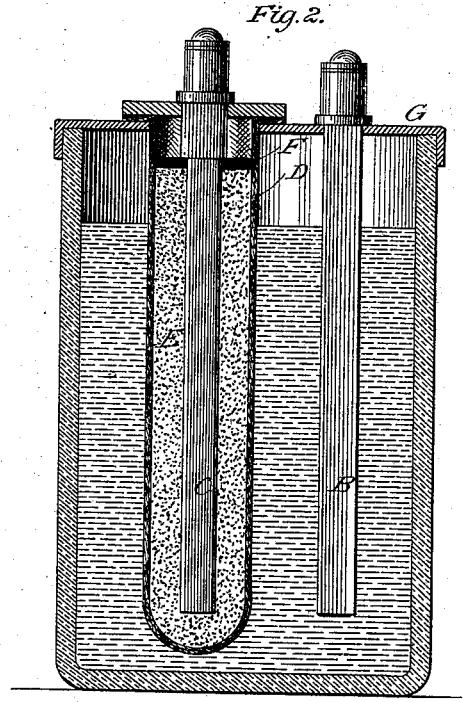

UNITED STATES PATENT OFFICE.

ALFRED HAID, OF RAHWAY, NEW JERSEY.

BATTERY.

SPECIFICATION forming part of Letters Patent No. 294,463, dated March 4, 1884.

Application filed September 12, 1883. (No model.)

*To all whom it may concern:*

Be it known that I, ALFRED HAID, a subject of the Emperor of Germany, and a resident of Rahway, Union county, New Jersey, have invented certain new and useful Improvements in Batteries, of which the following is a specification, reference being had to the drawings accompanying and forming a part of the same.

The objects of my invention are to produce a battery of small size and low cost, which shall be capable of producing a current of great constancy and high electro-motive force, or which may be used as a secondary battery or accumulator, to be charged by the passage through it of an electric current.

In carrying out my invention I use an ordinary cell or jar for containing the elements and the exciting-solution, for the elements a zinc rod or plate and a carbon rod or plate, the latter surrounded by a mixture of powdered carbon and Prussian blue, or a ferro-cyanide of similar nature—such as the ferro-cyanide of manganese contained in a porous jar or its equivalent—and for the liquid a solution of ammonium chloride, or any dilute acid, preferably sulphuric. These materials, I have found, secure all the objects sought when used in the manner which I will now describe in detail.

To make a galvanic battery, I place in an ordinary cell or jar a rod or plate of amalgamated zinc and a porous jar containing a carbon rod or plate, and a mixture of powdered carbon and Prussian blue, the latter being packed in around the carbon. The Prussian blue which I employ is the ordinary Prussian blue of commerce, though it should be in as pure a state as possible. It will be found advisable to mix it with the powdered carbon in proportions, by weight, of four parts of carbon to one of Prussian blue, though the proportions may be greatly varied. Into the jar I then pour a dilute solution of sulphuric or other acid, or ammonium chloride, and seal the jar in the usual way. The action of this battery is remarkably constant and energetic. The Prussian blue is nearly insoluble in the liquid, and forms a lasting and efficient depolarizing agent. By the continued use of the battery the zinc pole is eaten away by the solution, and the Prussian blue reduced to an inert condition as a depolarizing agent. The battery may then be revivified by passing a current through it from the carbon to the zinc pole, the effect of the current being to deposit metallic zinc from the liquid on the zinc pole, and to reoxidize the Prussian blue or restore it to its original active condition.

In combining these materials for use as a secondary battery, I prefer to use a sack or envelope of felt, asbestus, or similar material, in lieu of the porous jar, and to employ an amalgamated zinc plate in place of a rod. The zinc plate may, however, be supplanted by an amalgamated lead plate, if so desired, though in this case I add to the liquid some sulphate of zinc, in order to obtain a deposit of zinc on the lead plate in charging the cells.

As before intimated, I may substitute for the Prussian blue other ferro-cyanides of a similar character—such, for example, as the ferro-cyanide of manganese.

In the accompanying drawings convenient forms of the above-described battery are shown, Figure 1 being a central vertical section of the arrangement used for galvanic batteries; Fig. 2, a similar view of the arrangement for secondary batteries.

A designates the jar; B, the zinc plate or rod; C, the carbon plate or rod; D, the porous jar or its equivalent sack of felt or other material; E, the mixture of Prussian blue and powdered carbon surrounding the carbon plate; F, an insulating material covering the same; and G, the cap or cover for the jars, from which the electrodes are suspended.

In applying the mixture of Prussian blue and carbon to primary or galvanic batteries, I have found it desirable to use, in addition to said mixture, a depolarizing substance—such as red oxide of mercury and carbon—which I pack in the lower part of the porous jar. This, however, I do not claim herein; but I reserve the right to make the same the subject of another application.

Having now described my invention, what I claim is—

1. An electrode for galvanic or secondary batteries, consisting of a carbon rod or plate, in combination with a mixture of Prussian blue, or its described equivalent, and carbon, as described.

2. The combination, in a battery, of an acid or equivalent solution, a zinc pole, and a carbon rod or plate in a porous jar containing a mixture of Prussian blue and carbon, all as set forth.

In testimony whereof I have hereunto set my hand this 8th day of September, 1883.

ALFRED HAID.

Witnesses:
W. FRISBY,
W. H. DOGGETT.